United States Patent [19]

Shenk

[11] 4,396,268

[45] Aug. 2, 1983

[54] DUAL BURST, WIDE RANGE SONAR SYSTEM

[75] Inventor: Edwin K. Shenk, Westford, Mass.

[73] Assignee: Polaroid Corporation, Cambridge, Mass.

[21] Appl. No.: 296,508

[22] Filed: Aug. 26, 1981

[51] Int. Cl.³ .............................................. G03B 3/10
[52] U.S. Cl. .................................................. 354/198
[58] Field of Search ................. 354/195, 198; 352/140

[56] References Cited

U.S. PATENT DOCUMENTS

| 2,974,304 | 3/1961 | Nordlund | 340/33 |
| 3,723,952 | 3/1973 | Walsh | 367/100 |
| 4,199,246 | 4/1980 | Muggli | 354/195 |
| 4,238,154 | 12/1980 | Biber et al. | 354/198 |

Primary Examiner—Michael L. Gellner
Attorney, Agent, or Firm—David R. Thornton

[57] ABSTRACT

A sonic ranging system providing at least two bursts of sonic energy of unequal duration directed toward a subject with the time interval between the bursts being no less than the round-trip time for the maximum range at which a subject is to be detected by the preceeding burst includes a receiver which is blanked for a time related to the duration of each burst such that the shorter burst is used to detect very close subject distances and the longer burst employed for further distances. Preferably, the range detected by only one of the bursts is automatically utilized, depending upon whether the subject range is greater or less than a given distance.

15 Claims, 7 Drawing Figures

DUAL BURST, WIDE RANGE SONAR SYSTEM

BACKGROUND OF THE INVENTION

1. Field of the Invention

This invention relates to an ultrasonic ranging system and method.

2. Description of the Prior Art

Ultrasonic ranging systems are conventionally used in cameras to effect automatic focusing, in instruments for monitoring liquid level in containers, for proximity detectors, etc. U.S. Pat. No. 4,199,246, the disclosure of which is hereby incorporated by reference, is an example of an ultrasonic ranging system incorporated into a camera. The system in this patent transmits a burst of sonic energy towards a subject, and the transit time measured from the burst to receipt of an echo is a measure of subject range based on the assumption that the speed of sound is a constant. At room temperature, the speed of sound is about 340 msec; so that the time required for an ultrasonic burst to travel from a transducer to a subject 12 inches therefrom and then back to the transducer is about 1.78 msec.

In the patent referred to above, the burst transmitted by a transducer is in the form of a chirp whose frequency at the leading edge is about 65 kHz, and whose frequency drops to about 50 kHz within about 0.5 msec, and then remains constant for another 0.5 msec. The resultant burst thus lasts about 1 msec; and the provision of a variable frequency portion maximizes the possibility of obtaining a detectable return from subjects in the range of 3-8 feet, while the constant frequency portion is most effective for subjects more than 8 feet from the camera. As explained in the patent, a receiver for processing the output of the transducer is gain and bandwidth controlled and produces a range signal whose duration is proportional to subject range.

Inasmuch as a single transducer is used to both transmit the sonic energy and to receive echoes, proper operation requires the receiver to be blanked both during transmission of the burst and for a predetermined time thereafter. The latter operation is necessary in order to permit ringing of the transducer to terminate since only after such termination can the output of the receiver the associated with an echo. The time period that the receiver must be blanked depends on such parameters as the duration and power of the burst, etc; and for a 1 msec burst, about 600 usec following the burst is required for the ringing to subside significantly and permit the receiver to begin operation. Thus, for a 1 msec burst, the receiver is disabled for about 1.6 msec, with the result that a subject no closer than about 10 inches from the transducer can be detected. While this minimum subject distance is adequate for most camera work, in some instances and in other applications of ultrasonic ranging, detections of subjects closer than 10 inches is desirable.

When an ultrasonic ranging system of the type disclosed in the patent referred to above is used in environments other than cameras for distance measuring purposes, the usual procedure is to provide for a repetitious transmission of ultrasonic bursts and a memory for storing a representation of subject range, the memory being updated after each transmission occurs. In this general application of ultrasonic ranging, it is often necessary or desirable to detect subjects as far away as 30 feet. In order to ensure detection with this dynamic range, the transmitted ultrasonic burst should continue for a duration of about 1 msec. Inherently, this arrangement will not permit detection of subjects closer than about 10 inches.

It is, therefore, an object of the present invention to provide a new and improved ultrasonic ranging system wherein the problems and deficiencies outlined above are reduced or substantially overcome.

SUMMARY OF THE INVENTION

The present invention provides a ranging system where at least two spaced apart bursts of sonic energy of unequal duration are transmitted from a transducer toward a subject, the interval between the bursts being no less than the round-trip time for the maximum range at which a subject is to be detected by the preceeding burst. The output of the transducer is processed in a receiver which produces a range signal representative of subject distance. Preferably, a representation of subject distance is stored based on one or the other of the range signals depending on the location of the subject relative to a preselected distance. When the subject range is less than the preselected distance, the range signal associated with the shorter duration burst is selected as the basis for storing the representation of subject range; while the longer duration burst is selected when subject range is greater than the preselected distance.

By reason of this arrangement, a short duration CW burst can be capable of detecting close-by subjects, while a long duration CW burst, or chirp as disclosed in U.S. Pat. No. 4,199,246, can detect subjects further away. A two-burst system is adequate for many uses, including a still picture camera use; but for movie cameras and for general-purpose proximity detectors, a repetitive mode of operation is utilized, producing bursts of relatively short duration interleaved with bursts of relatively longer duration. In such case, memory is updated by a range signal associated with either the shorter duration or the longer duration burst, depending on whether the subject is within or beyond the preselected distance. Thus, updating occurs, on the average, at half the repetition rate of the bursts. Finally, an indicator may be provided for indicating the relationship between subject range and the preselected distance, i.e., whether updating is based on echoes from the shorter or the longer duration bursts.

BRIEF DESCRIPTION OF THE DRAWINGS

Embodiments of the present invention are shown in the accompanying drawings, wherein.

DETAILED DESCRIPTION

Figure 1:
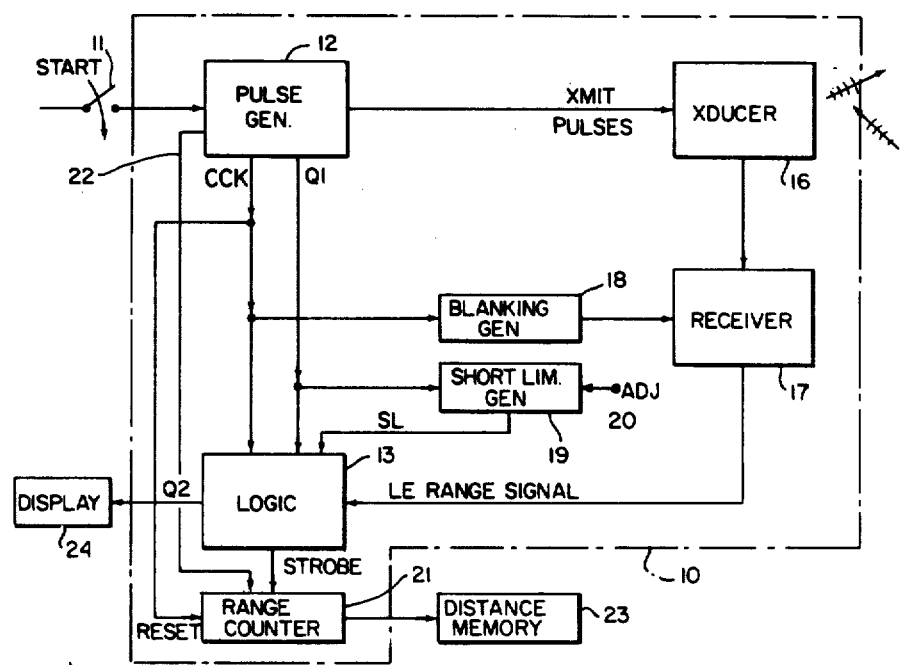
FIG. 1 is a block diagram of a repetitive mode, ultrasonic ranging system according to the present invention.

Referring now to FIG. 1 of the drawings, reference numeral 10 designates a continuous mode, ultrasonic ranging system according to the present invention. When start switch 11 is closed, pulse generator 12 begins to produce clock signal CCK (line 1 of FIG. 2) having a period equal to the round-trip time for the maximum range at which a subject is to be detected. When such maximum range has the order of magnitude of approximately 30 feet, the period of clock signal CCK is preferably about 200 msec. Control signal Q1 (line 2 of FIG. 2) produced by pulse generator 12 is obtained by a "divide-by-2" circuit, and produces a pulse train whose period is twice the period of the pulses CCK. The pulse trains Q1 and CCK are applied to logic circuit 13, whose operation is described below.

Figure 2:
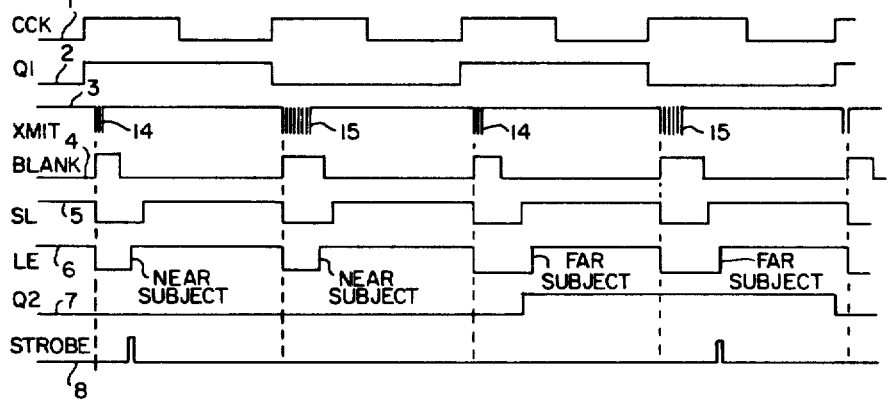
FIG. 2 is a timing diagram for illustrating the waveforms produced by the various components of the circuit shown in FIG. 1.

Pulse generator 12 also produces a pulsed output identified as "XMIT", shown in line 3 of FIG. 2. Output "XMIT" comprises at least a first pulse 14 or train of periodic oscillations of a predetermined frequency, preferably 50 kHz, followed by a second pulse 15 or train of oscillations preferably of a variable frequency ranging from 65 kHz to 50 kHz. The pulse 14 is shorter in duration than pulse 15, and preferably of the order of magnitude of 100 usec, producing about 5 cycles when the frequency of the oscillations is 50 kHz. On the other hand, the pulse 15 is much longer in duration, or about 1 msec, and similar to the chirp produced in U.S. Pat. No. 4,199,246. That is to say, the frequency of the oscillations in burst 15 changes from about 65 kHz to 50 kHz within about 0.5 msec, and then the frequency remains constant for another 0.5 msec at about 50 kHz. Each of the pulses 14, 15 begins in synchronism respectively with the leading edges of alternate pulses CCK; the slight delay shown in FIG. 2 being exaggerated for purposes of illustration.

The pulses 14 and 15 are applied to transducer 16, causing the latter to produce matching bursts of sonic energy which radiate outwardly from the transducer toward a subject following a pattern which depends upon the configuration of the transducer, as explained in U.S. Pat. No. 4,199,246. Any echo from such bursts is applied through the transducer 16 to a receiver 17; and it is necessary, by reason of the operation of transducer 16, to blank the receiver during transmission of the sonic bursts and for a short period of time subsequent to the termination of the bursts, in order to permit the ringing of the transducer to terminate and allow echoes from subjects illuminated by the sonic bursts to be processed by receiver 17. The time that the transducer must be blanked subsequent to termination of a burst therefrom will depend upon the level of energy in the burst, as well as its duration. For a given transducer and level of excitation, blanking for about 600 usec following termination of a burst from the transducer is usually adequate to assure complete damping of the ringing of the transducer. As later described in detail with regard to FIG. 3, still shorter blanking may be employed for the shorter sonic burst due to its lower level of transducer excitation.

Figure 6A:
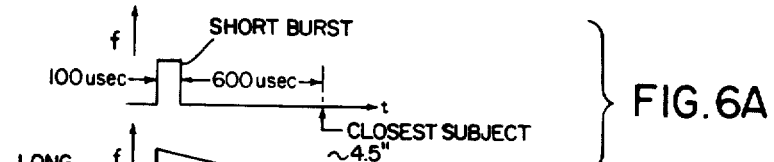
FIGS. 6A and 6B illustrate two types of bursts used with the present invention.
Figure 6B:
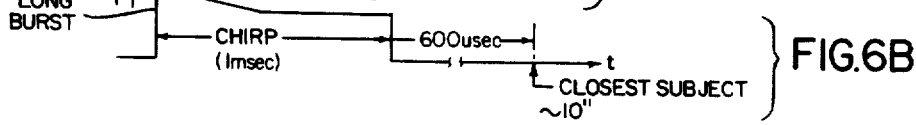

As shown in FIGS. 6A and 6B, it follows that when used at room temperature with the above 600 usec blanking after the burst, the closest subject that can be detected using a short burst of 100 usec is approximately 4.5 inches, while the closest subject that can be detected using the chirp is approximately 10 inches. While the peak value of both bursts are the same in this embodiment, since the initial burst is of short duration, it is of limited power and, hence, effective to detect subjects only slightly beyond 15 inches, while the longer burst is effective to detect subjects from 10 inches to 30 feet.

Blanking generator 18 controls the blanking of receiver 17 in accordance with clock pulses CCK. Thus, blanking generator 18 produces the blanking pulses shown in line 4 of FIG. 2; such blanking pulses being of a duration of approximately 700 usec when the shorter duration pulse 14 occurs, and of approximately 1.6 msec when the longer duration pulse is produced. Thus, the blanking pulses applied to receiver 17 preclude the latter from processing the output of transducer 16 for the duration of the blanking signal.

At termination of the blanking signal applied to receiver 17, the latter is automatically enabled, and echoes received by the transducer 16 are processed for producing a range pulse or range signal LE such as shown in line 6 of FIG. 2. Receiver 17 is both gain and bandwidth controlled in the manner illustrated in U.S. Pat. No. 4,199,246 for the purpose of increasing the signal-to-noise ratio for subjects at various distances with respect to the transducer. Each range pulse LE is applied to a logic unit 13 and as later explained, under select conditions, causes it to produce a strobe signal, as shown in the last line of FIG. 2, coinciding with the trailing edge of the range pulse. The strobe signal is fed to a range counter 21, to strobe the count of the latter to a distance memory 23 which stores (and may also display) the subject range. Now since both the short and the long burst can produce an echo from subjects located in partially overlapping distances from the apparatus, the production of the strobe signal, as later explained in detail, is controlled in accordance with the location of a subject in relation to a near, or short limit distance so that each burst will be utilized for the near or far range for which it is designed.

Each range pulse or range signal produced by receiver 17 begins in coincidence with the beginning of a blanking signal from blanking generator 18 which coincides with the beginning of a burst produced by transducer 16, and each range signal terminates when transducer 16 receives an echo that is processed by receiver 17. Thus, the duration of the range signal produced by receiver 17 is representative of the range of a subject producing that received echo.

Consequently, it should be understood that the pulse generator 12, the transducer 16 and the receiver 17 provide transmitting and receiving means for transmitting at least a pair of spaced apart sonic bursts, with one of the bursts being of relatively short duration as compared to the other, and the blanking generator 18 provides means for blanking the receiver for a relatively short period upon initiation of the short burst and for a comparatively long period for the long burst.

Now, in addition to clock signal CCK and control signal Q1 produced by pulse generator 12, and the range signal LE produced by receiver 17, the logic unit 13 also receives a reference signal SL (line 5 of FIG. 2) produced by near limit generator 19 under the influence of control signal Q1. Each reference signal SL begins in coincidence with the leading edge of a burst produced by transducer 16, and terminates after a period of time fixed or established by an adjustment control 20 of the limit generator 19 so that the duration of each reference signal SL is a measure of a preselected distance from the transducer.

Thus, the system determines the elasped time between initiation of a given burst and the echo therefrom and compares this range-related time LE with a fixed elapsed time SL. When the range time LE associated with the short burst is equal to or less than the fixed time represented by the reference signal SL, the short burst is ultilized for detection while the converse is true for the long pulse. Preferably, the upper limit of the distance zone corresponding to the short burst, i.e., the preselected distance, should overlap the lower limit of the operable zone of the long burst. In fact, since the short burst is more accurate than the long burst at near distance, it is preferable to let the short burst zone extend a suitable amount into the long burst zone.

In practice, this preselected time or its related distance is a short distance within which the short burst produced by transducer 16 will be most effective in detecting subjects. For example, the fixed time could be about 2.67 msec representative of a preselected distance of about 15 inches when the short duration burst has a frequency of 50 kHz. Thus, the short duration burst would be effective in detecting subjects located in a zone extending from about 4.5 inches from the transducer to about 15 inches. In order to effect this detection, logic unit 13 is arranged to produce a strobe signal (see line 8 of FIG. 2) at the trailing end of a range signal under either of the following two conditions: (1) the range signal LE terminates before the reference signal SL, and the control signal Q1 exists; or (2) the range signal LE terminates subsequent to the reference signal SL, and the control signal Q1 does not exist.

Stated in logical terms, a strobe signal is produced under the following conditions: strobe = LE·$\overline{SL}$·Q1 or LE·SL·$\overline{Q1}$.

The ANDing of the range and reference signals with the control signal Q1 gives rise to producing a strobe signal based on only one of successive short or long duration bursts a strobe signal by both range signals. The advantage of this arrangement is that the short duration burst is used to detect and determine the range of a subject within the near preselected distance from the transducer (where this burst is most effective) whereas the long duration burst is used to detect and determine the range of a subject beyond the near preselected distance (where this burst is most effective). In this way, the use of the relatively short and long duration bursts is optimized, each burst producing results optimized for the burst involved.

Included with system 10 is range counter 21, which is incremented by output 22 from pulse generator 12. When associated with a camera, pulse generator 12 comprises a scaled clock for output 22 such as is described in U.S. Pat. No. 4,199,244, whose disclosure is incorporated by reference, the operation of the scaled clock being initiated on the leading edge of the clock pulses from the clock signal CCK. If a linear relationship is satisfactory, as in the case of a direct reading rangefinder, the output 22 is a train of pulses at a uniform repetition rate. In either case, output 22 increments range counter 21 so that, when an echo is received by the transducer thereby terminating the range pulse under conditions which produce a strobe signal, the contents of range counter 21 represent the range of the subject. The strobe signal strobes the current contents of range counter 21 into distance memory counter 23, which thus contains a number representative of the distance of the subject. Meantime, range counter 21 continues to be incremented by output 22, resetting of the counter occurring by the leading edge of a clock pulse of clock signal CCK. Consequently, the output train 22, the logic unit 13, counter 21 and memory 23 constitute means for recording a range signal only from said short burst when the subject distance is less than a preselected distance (i.e., when the range signal is less than a given time representative of that distance) and only from the long burst when the subject distance is greater than that preselected distance.

In effect, the inventive apparatus provices a dual ranging system providing extended ranging with one system or mode producing a short burst covering a close zone for close subjects and the other, a long burst covering a near to far zone which adjoins or preferably overlaps the far end of the close zone. A maximum range limit is preset for the short zone, and preferably, only the short burst mode is utilized when a subject is located in the short zone. Thus, when an echo from the short burst is received within a fixed time representative of a subject at the preset limit, effective operation by the long burst mode is precluded. Preferably, the latter is accomplished by precluding the end result, namely the recording of the subject distance as measured by the long burst.

Also associated with system 10 is display 24, which is constituted as an indicator (e.g., an LED indicator) for identifying which burst of the pair of bursts produces the range pulse that updates distance memory 23. To this end, logic 13 only produces a signal Q2, (line 7 of FIG. 2) when a subject is beyond the preselected near limit or, that is, when the termination of the range signal LE occurs subsequent to the termination of the reference signal SL and the control signal Q1 does not exist. Logically speaking, indicator signal Q2 is set when Q2 = LE·SL·$\overline{Q1}$ first occurs.

The logic unit 13 carries out the necessary logical combination of signals to produce the signal Q2 which is used to strobe the echo information from the long burst into the memory, and additionally to activate an indicator in display 24, thereby indicating that subject range is being determined by the longer of the two bursts.

Obviously, a different type of indicator signal could be provided for indicating that the shorter of the two bursts is used for determining subject range.

In operation, system 10 is oriented such that transducer 16 faces in the desired direction of a subject whose range is to be determined. The closing of switch 11 powers the components of system 10, causing transducer 16 to repetitiously transmit bursts of sonic energy towards a subject, and for producing outputs that are applied to receiver 17, which produces range signals by which a representation of subject distance is stored in distance memory 23. Blanking generator 18 operates as control means for blocking the receiver during the transmission of a burst, and for a predetermined period of time thereafter.

The first burst produced by transducer 16 will be a CW burst of about 5 cycles at 50 kHz lasting for approximately 100 usec. About 200 usec later, transducer 16 will produce a chirp having a frequency that changes from about 65 kHz to about 50 kHz in about 0.5 msec and remaining constant at about 50 kHz for another 0.5 msec. About another 200 msec later, the sequence of bursts is repeated. For about 600 usec subsequent to the termination of each of the shorter and longer duration bursts, receiver 17 is blanked by the output of blanking generator 18.

If the end of the range signal produced by receiver 17 as a result of the short burst occurs before the end of the reference pulse produced by generator 19, then logic unit 13 will produce a strobe pulse which will strobe the contents of range counter 21 into distance memory 23. Under this set of circumstances, logic unit 13 will prevent the generation of a strobe pulse following the long duration burst from transducer 16. The cycle then repeats, with the next short duration burst causing logic unit 13 to again strobe the contents of counter 21 into distance memory 23 on the termination of the range pulse associated with the short burst.

On the other hand, if the subject is beyond the preselected distance as established by the reference signal produced by generator 19, logic unit 13 will prevent the generation of a strobe signal on the termination of the range signal caused by the short burst and generates a strobe pulse as a consequence of an echo received from the long burst. Thus, the invention provides logic means for applying the range signal associated with the burst having the shorter duration to the distance memory only if the subject range is less than a preselected distance, and applies the range signal associated with the burst having the longer duration to the distance memory only if the subject range exceeds the preselected distance.

The arrangement described above continues with distance memory 23 being updated on alternate bursts, depending upon the relationship between the subject and the preselected distance as established by the reference signal SL until switch 11 is opened. Updating of the memory thus occurs at a rate of about 2½ times per second.

Figure 3:
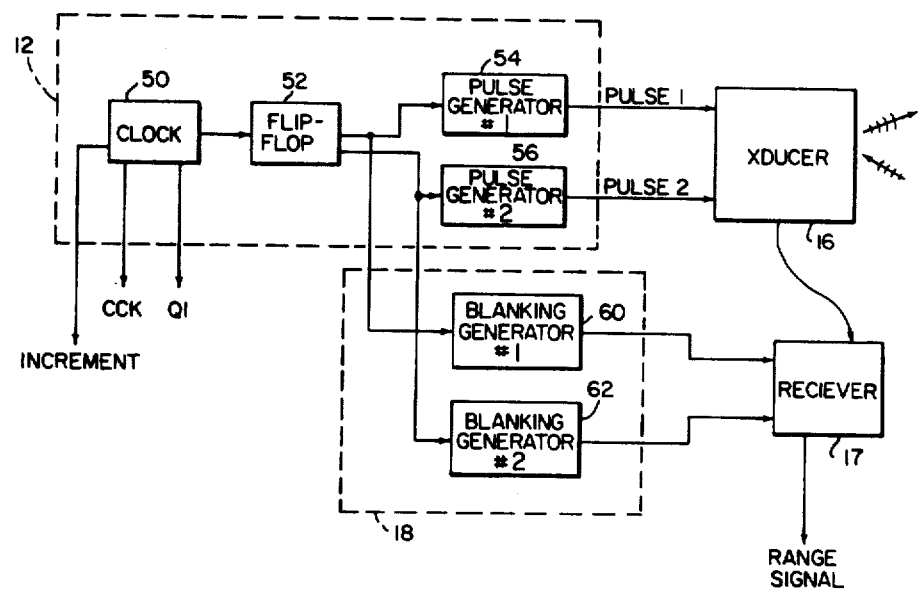
FIG. 3 is a block diagram illustrating a portion of an alternate embodiment of the present invention.

In the system illustrated in FIGS. 1 and 2, the blanking period following each pulse is presumed equal; however, to maximize close-up detection, the short pulse may be of lower peak value as well as short duration to thereby lower the excitation level of the transducer which in turn permits the burst to be followed by a comparatively short blanking time. Such an arrangement may be provided by keying an appropriate blanking pulse to the respective long and short transducer drive pulses as shown in FIG. 3. It being understood that while the circuit portion depicted by FIG. 3 is illustrated for clarity in discrete blocks, in practice, like the system of FIG. 1, the functional arrangements would be provided in integrated solid state circuit chips.

In FIG. 3, the pulse generator 12 is shown to include a clock 50 which drives a flip-flop network 52 to, in turn, alternately trigger first and second pulse generators 54 and 56; the pulse generator 54 delivering a low peak value, short pulse of 100 usec duration to the transducer 16 and the pulse generator 56 delivering a high peak value, long pulse of 1 msec duration. In tandem with the alternate pulses, a short and long blanking pulse is impressed upon the receiver 17 by means of first and second blanking generators 60 and 62.

Blanking generator 60 delivers a blanking pulse of, for example, approximately 400 usec, providing a short blanking of 300 usec following the end of the short ultrasonic burst while blanking generator 62 delivers a long blanking pulse of 1.6 msec providing blanking of 600 usec following the long sonic burst. Hence, flip-flop 52, pulse generators 54 and 56 provide means for alternatively producing spaced short and long transducer driving pulses while blanking generators 60 and 62 provide means for producing short and long receiver blanking pulses following each of the respective driving pulses.

Figure 4:
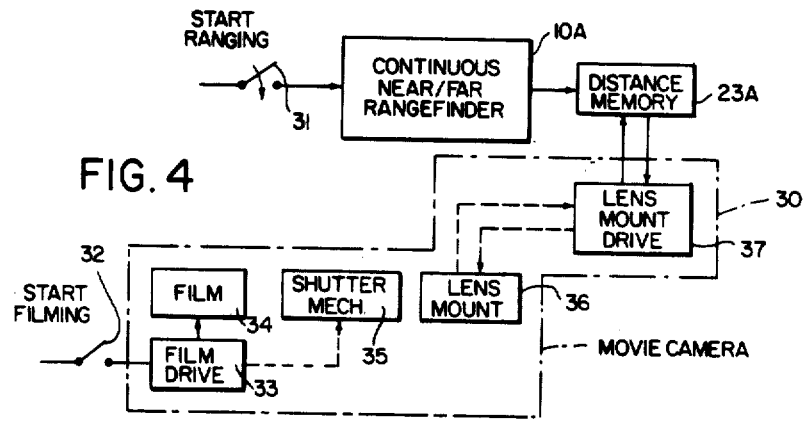
FIG. 4 is a block diagram of a movie camera in which the continuous mode ultrasonic ranging system shown in FIG. 1 is utilized.

The basic concept disclosed in system 10 can be applied directly to a movie camera, as illustrated in FIG. 4, which essentially illustrates the movie camera 30 as disclosed in FIG. 10A of U.S. Pat. No. 4,199,244. In this case, the closing of ranging switch 31 will cause system 10A to continuously update distance memory 23A every 400 msec, thereby permitting the contents of the distance memory to track a subject which may be moving relative to camera 30. When the operator closes switch 32, film drive motor 33 begins to operate, thereby moving film 34 intermittently relative to shutter mechanism 35, which is operated in a conventional manner. Light from the scene being photographed passes through lens mount 36 and through the shutter mechanism, and is incident on film 34. Lens mount 36 is driven to a location for maintaining the subject in focus by the operation of drive 37, which is connected to the distance memory 23A as described in U.S. Pat. No. 4,199,244.

Figure 5:
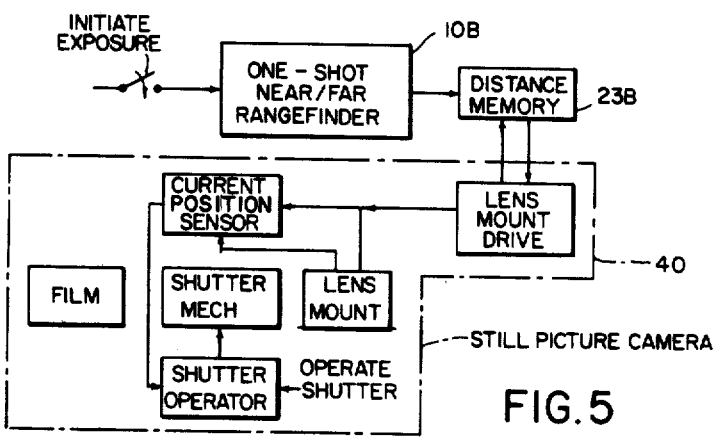
FIG. 5 is a block diagram of a still picture camera into which a one-shot ultrasonic ranging system according to the present invention is incorporated.

The present invention can also be incorporated into a still picture camera by modifying pulse generator 12 to produce only a pair of oscillations that excite transducer 16 into transmitting two bursts of sonic energy from the transponder where the time between the bursts is no less than the round-trip time for the maximum range at which a subject is to be detected by the first of such bursts. This arrangement is illustrated in FIG. 5, wherein still picture camera 40 is similar to that shown in FIG. 4A of U.S. Pat. No. 4,199,244. In this case, upon actuation, the rangefinder 10B produces a single pair of ultrasonic bursts, as described above. Distance memory 23B permits a representation of the subject range to be stored in response to either the shorter or the longer duration burst in accordance with the position of the subject with respect to the preselected distance as determined by the output of the short limit generator previously described. Since the pulse sequence is not automatically repeated, the strobe logic is altered to produce the "far" strobe signal at the termination of the second range pulse rather than wait for a subsequent range pulse as illustrated in FIG. 2.

While specific details of the relatively short and the relatively long ultrasonic bursts have been given above, such details are only exemplary. For example, both bursts could be CW signals at the same or different frequencies, or at frequencies different from the frequencies in the example given above. It should also be noted that the system and method are also applicable to ranging apparatus employing separate transmit and receive transducers (even though somewhat less blanking following the transmission may be required in such apparatus) since the blanking time in any case must be at least equal to the length of the burst being transmitted.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

What is claimed is:

1. A sonic rangefinder system comprising transmitting and receiving means for transmitting a burst of sonic energy toward a subject and for receiving an echo therefrom so as to produce a range signal representative of subject distance in accordance with the elapsed time between transmission and reception, said transmitting means including a receiver and blanking means for blanking said receiver in synchronism with transmission of a burst for a blanking period in accordance with at least the duration of said burst, said tramsmitting and receiving means including means for automatically transmitting at least a pair of spaced apart bursts of sonic energy with one of said bursts being a short burst and the other thereof being a long burst, and said blanking means including means for blanking said receiver for a relatively short blanking period during the duration of said short burst and for a relatively long blanking period during the duration of said long burst so that said long burst is applicable to distant subjects whose echo return time is greater than said short blanking period while said short burst is applicable to determine near subject distances, including those whose echo return time is greater than said short blanking period but less than said long blanking period.

2. The system of claim 1 wherein said short and long blanking periods continue for equal duration following termination of their respective bursts.

3. The system of claim 1 wherein said short burst is of lower peak value than said long burst, and said short blanking period continues for a relatively short predetermined time following termination of said short burst while said long blanking period continues for a relatively long predetermined time following said long burst.

4. In a sonic rangefinder system having transmitting and receiving means for transmitting a burst of sonic energy toward a subject and for receiving an echo therefrom so as to produce a range signal representative of subject distance in accordance with the elasped time between transmission and reception, said transmitting means including a receiver and blanking means for blanking said receiver in synchronism with transmission of a burst for a blanking period in accordance with at least the duration of said burst, the improvement wherein said transmitting and receiving means includes means for transmitting at least a pair of spaced apart bursts of sonic energy with one of said bursts being a short burst and the other thereof being a long burst, and said blanking means includes means for blanking said receiver for a relatively short blanking period for transmission of said short burst and for a relatively long blanking period for said long burst so that said short burst is applicable to determine near subject distances while said long burst is applicable to more distant subjects and said system including means for recording a range signal only from transmission of said short burst when the distance to the subject is less than a predetermined distance and only from transmission of said long burst when the distance to the subject is greater than said predetermined distance.

5. The system of claim 4 including means for displaying which burst of said pair produces said recording of a range signal.

6. A sonic rangefinder system comprising:
a transducer for transmitting a burst of sonic energy toward a subject and for producing an output in response to receiving an echo;
means for controlling the operation of the transducer so that it produces at least a pair of spaced apart bursts of different durations;
means including a receiver, responsive to the output of the transducer, for producing a range signal associated with the burst that was echoed from the subject;
control means for blanking the receiver during transmission of the bursts and for a period of time thereafter;
a distance memory; and
logic means for applying the range signal associated with the burst having the shorter duration to the distance memory only if the subject range is less than a predetermined distance and for applying the range signal associated with the burst having the longer duration to the distance memory if the subject range exceeds said preselected distance.

7. The system of claim 6 including a clock-driven range counter, means for resetting the counter each time the transducer transmits a burst so that the contents of the range counter is representative of subject range at the instant of echo reception by the receiver, said logic means being effective to only strobe the range counter into the distance memory in response to reception by the receiver of an echo from the shorter burst after an elapsed time less than a fixed time representative of said predetermined distance or reception of an echo from the longer burst after an elapsed time exceeding said fixed time.

8. The system of claim 6 including an indicator responsive to the logic means for indicating the relationship between subject range and said preselected distance.

9. A camera in combination with the rangefinder of claim 6 wherein the camera includes focusing means responsive to the contents of the distance memory.

10. The system of claim 6 wherein the means for controlling operation of the transducer causes the latter to produce a plurality of pairs of bursts, each pair having bursts of different duration, whereby the distance memory is continuously updated.

11. A movie camera in combination with the system of claim 10 wherein the camera includes focusing means responsive to the contents of the distance memory.

12. In a sonic rangefinder system having transmitting and receiving means for transmitting a burst of sonic energy toward a subject and for receiving an echo therefrom so as to produce a range signal representative of subject distance in accordance with the elapsed time between transmission and reception, the improvement wherein said transmitting and receiving means includes means for transmitting at least a pair of spaced apart bursts of sonic energy with one of said bursts being a short burst and the other thereof being a long burst and means for producing a range signal responsive to the echo from said short burst when the elapsed time for receipt of its echo is less than a given fixed time and for producing a range signal responsive to the echo from said long burst when the time for its echo is greater than said fixed time so that said short burst is applicable to determine near subject distances while said long burst is applicable to more distant subject locations.

13. In a sonic rangefinder system having transmitting and receiving means for transmitting a burst of sonic energy toward a subject and for receiving an echo therefrom so as to produce a range signal representative of subject distance in accordance with the elapsed time between transmission and reception, the improvement wherein said transmitting and receiving means includes means for transmitting at least a pair of spaced apart bursts of sonic energy with one of said bursts being a short burst and the other thereof being a long burst and means for utilizing the echo from said short burst for subject distance when the elapsed time for receipt of its echo is less than a given fixed time and for utilizing the echo from said long burst when the time for its echo is greater than said fixed time so that said short burst is applicable to determine near subject distances while said long burst is applicable to more distant subject locations, said system including means for recording a range signal only from transmission of said short burst when the distance to the subject is less than a predetermined distance and only from transmission of said long burst when the distance to the subject is greater than said predetermined distance.

14. A ranging method for detecting the distance to a subject comprising the steps of:

initiating a relatively short burst of sonic energy directed toward a subject;

enabling a receiver after a short time consistent with said short burst to detect an echo from said subject;

determining the distance to said subject based upon the elapsed time between initiation of said short burst and reception of its echo from said subject when such elapsed time is less than a given elapsed time consistent with a first maximum subject distance;

initiating a relatively long burst of sonic energy directed toward said subject, at least when the elapsed time between initiation of said short burst and return of its echo is greater than said given elapsed time;

enabling said receiver after a long time consistent with said long burst to detect an echo from said subject; and determining the distance to said subject based upon the elapsed time between initiation of said long burst and reception of its echo at least when its elapsed time is greater than said given elapsed time whereby said short burst is employed for distances up to said first maximum distance and said long burst is employed for distances beyond said first maximum distance.

15. A ranging method for detecting the distance to a subject comprising the steps of:

initiating a relatively short burst of sonic energy directed toward a subject;

enabling a receiver following initiation of said short burst after a first short blanking time at least equal to the duration of said short burst such that the closest subject detectable by said receiver in response to said short burst is defined by the duration of said short blanking time;

determining the distance to said subject based upon the elapsed time between initiation of said short burst and reception of its echo from said subject when such elapsed time is greater than said short blanking time and less than a given elapsed time consistent with a first maximum subject distance;

initiating a relatively long burst of sonic energy directed toward said subject at least when the elapsed time between initiation of said short burst and reception of its echo is greater than said fixed preselected elapsed time;

enabling said receiver following initiation of said long burst at an extended blanking time at least equal to the duration of said long burst such that the closest subject detectable by said long burst is defined by the duration of said extended blanking time; and determining the distance to said subject based upon the elapsed time between initiation of said long burst and reception of its echo at least when such elapsed time is greater than said given elapsed time consistent with said first maximum subject distance.

* * * * *